United States Patent
Abadzhimarinov et al.

(10) Patent No.: US 11,698,799 B2
(45) Date of Patent: Jul. 11, 2023

(54) LAZY LOADING OF CODE CONTAINERS BASED ON INVOKED ACTIONS IN APPLICATIONS

(71) Applicant: VMware, Inc., Palo Alto, CA (US)

(72) Inventors: Branislav Abadzhimarinov, Sofia (BG); Asen Radev, Sofia (BG); Petar Nikalaev Ivanov, Sofia (BG); Dimitar Kanev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 17/154,540

(22) Filed: Jan. 21, 2021

(65) Prior Publication Data
US 2022/0229673 A1 Jul. 21, 2022

(51) Int. Cl.
*G06F 8/41* (2018.01)
*G06F 9/445* (2018.01)
*G06F 3/0482* (2013.01)

(52) U.S. Cl.
CPC ........ *G06F 9/44521* (2013.01); *G06F 3/0482* (2013.01); *G06F 8/41* (2013.01)

(58) Field of Classification Search
CPC ....... G06F 9/44521; G06F 8/41; G06F 3/0482
USPC .......................................... 717/162
See application file for complete search history.

(56) References Cited

U.S. PATENT DOCUMENTS

| | | | |
|---|---|---|---|
| 6,744,450 B1 * | 6/2004 | Zimniewicz | G06F 8/61 715/825 |
| 2003/0225921 A1 * | 12/2003 | Hostetter | G06F 9/44557 719/311 |
| 2007/0198741 A1 * | 8/2007 | Duffy | G06F 16/957 707/E17.116 |
| 2011/0225579 A1 * | 9/2011 | Khandelwal | G06F 8/60 717/177 |
| 2013/0036381 A1 * | 2/2013 | Joshi | G06F 16/9535 715/810 |

(Continued)

FOREIGN PATENT DOCUMENTS

WO  WO 2013097592 A1 * 7/2013 ........... G06F 16/958

OTHER PUBLICATIONS

Title: Operation Using Asynchronous Remote Method Invocation, author; Sproch, published o 2012.*

(Continued)

*Primary Examiner* — Chameli Das
(74) *Attorney, Agent, or Firm* — Clayton, McKay & Bailey, PC

(57) ABSTRACT

A system can improve application performance by using lazy loading of code containers based on non-navigational actions in single-page or hybrid applications. A page can launch by loading a main bundle of code. The main bundle can include an action manifest that maps action identifiers to separate code modules. Those separate code modules can include functions for handling the actions. Based on a non-navigational action that occurs, the application can use the action manifest to map a first action identifier of the first action to a first code module. The application can then lazy load a first code module asynchronously from the main bundle. The application can also use route guards with filters to determine child actions, validate action routes, and cache the validated routes for later use without a remote server call.

17 Claims, 5 Drawing Sheets

(56) References Cited

U.S. PATENT DOCUMENTS

| | | | |
|---|---|---|---|
| 2015/0100879 A1* | 4/2015 | Nandagopal | G06F 9/44521 715/235 |
| 2016/0162264 A1* | 6/2016 | Wong | G06F 9/44505 717/114 |
| 2018/0012144 A1* | 1/2018 | Ding | H04L 63/1408 |
| 2018/0217964 A1* | 8/2018 | Lin | G06Q 30/0267 |
| 2019/0227815 A1* | 7/2019 | Ames | G06F 9/445 |
| 2020/0264848 A1* | 8/2020 | Stober | G06F 8/40 |

OTHER PUBLICATIONS

Title: The Dynamic Retrieval Tree Menu Based on Dojo, author: X Zhang, et al, published on 2011.*
Title: High-Performance Framework For Web Applications, author: F van Gemeren, published on 2009.*

* cited by examiner

LAZY LOADING OF CODE CONTAINERS BASED ON INVOKED ACTIONS IN APPLICATIONS

BACKGROUND

Lazy loading is a strategy to identify resources as non-critical and load those resources only when needed. This can shorten the critical rendering path for a webpage or application, leading to reduced load times. Lazy loading can be important for speeding up application load time and reducing script processing during runtime by a browser. This is because large assets that are not yet needed can be loaded later when the user is navigating to those assets. For example, a webpage can load large images only when they are needed, allowing bandwidth to be utilized for those images and items that are on screen.

Typically, lazy loading is triggered based on scrolling or navigation. For example, ANGULAR includes a built-in router that enables navigation from one view to another as a user performs navigational tasks. Navigation can trigger loading of additional ANGULAR modules, which can be chunks of executable code usually packaged in JAVASCRIPT files. For lazy loading to work in this manner, the ANGULAR compiler can compile the application in such a way that the code is split into several files (called modules or containers) during build time. The compiler can split the code into modules based on a route configuration that describes which view corresponds to which uniform resource locator ("URL"). Splitting code into modules allows for invoking individual code modules to load at different times based on navigation.

However, these techniques do not allow for triggering lazy loading in other non-navigational contexts. For example, a non-navigational action such as a menu selection that populates new items on the same page will not trigger lazy loading. Similarly, lazy loading is not triggered by a button on a page that makes an application programming interface ("API") call or causes some additional prompt on that page. Therefore, code for handling those non-navigational actions must be included with the main bundle of code for the page, potentially slowing load times for the page. Similarly, in hybrid applications with multiple frameworks, code modules responsible for running frameworks that are not immediately needed still must be loaded up front, slowing initial load times. In summary, existing lazy loading techniques do not work effectively with data-driven and action-based application flows beyond simple navigation.

Therefore, a need exists for systems and methods for lazy loading of code containers based on invoked actions in single-page and hybrid applications.

SUMMARY

Examples described herein include systems and methods for lazy loading code modules based on non-navigational actions in a single-page application or hybrid application. A single-page application can be a web application that interacts with the user by dynamically rewriting the current page with new data from the webserver. A hybrid application can have multiple frameworks within a single application. The application can run on a server, the user device, or in part on both.

The application can display a page by loading a main bundle of code. The main bundle can include code for essential functions and objects that must be present immediately on the page. But the main bundle can also include an action manifest that maps action identifiers to separate code modules that are loaded asynchronously based on non-navigational actions within the application. Those separate code modules can include functions for handling the actions of the action manifest. Based on a non-navigational action that occurs, the application can use the action manifest to map a first action identifier of the first action to a first code module. The application can then lazy load a first code module asynchronously from the main bundle. The application can also use route guards with filters to determine child actions, validate action routes, and cache the validated routes for later use without a remote server call.

A code module can be a container of a chunk of code that is separate from the main bundle used to initialize an application or a page of the application. The code module can be lazy loaded by executing the module, which can include executable code, at some later time after the main bundle is already loaded. This can cut down on application load times. Additionally, an action-based route tree for loading code modules can ensure that actions are available when needed by the user.

To split the application code up into the main bundle and additional code modules, a compiler can use a routing table as a guide. The routing table can include relations between actions such that the compiler can make decisions on which actions are available before other actions. Actions that are not immediately needed can be lazy loaded by including corresponding functions, services, frameworks, and action handlers in code modules that are separate from the main bundle. These code modules can then be lazy loaded asynchronously when actions within the application dictate loading the additional code modules.

An action manifest can allow the application to map actions to needed code bundles. When an action is performed, such as clicking a button, the application can send a corresponding action identifier to an action manifest service. That service can return the one or more code modules to load. The code modules can be executed, which can include registering action handlers for one or more actions, such as the button click.

Additionally, a route guard with filters can be used to determine which menu options or other actions are available to a user. The application can traverse multiple levels of a route tree specified by that route guard to determine which options are available. The filters at multiple levels of the route can be collected and used in a single remote call to a server to validate which options (actions) are available. If some of these actions rely on additional code modules, the code modules can be lazy loaded. Additionally, the validated routes can be cached such that future user interaction with the menu does not require additional remote calls to validate an action.

These methods can result in faster application load times while also minimizing the occurrence of users requesting actions that are not yet available. As a result, user experience can be positively increased with respect to a single-page or hybrid application.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, build-time and run-time features allow for lazy loading code modules of an application in an action-based manner rather than based on page navigation. The application can be a single-page application, which can be a web application that interacts with the user by dynamically rewriting the current page with new data from the webserver. Single-page applications often load slowly, however, since current methods typically load and reload the entire page each time.

To allow for action-based lazy loading, during build-time of the application a compiler can organize code of an application into different code modules. The code can be organized into the different code modules based on a route configuration. The route configuration can be a routing table that specifies which actions lead to other available actions or functions. This can be used either manually or by the compiler to create an action manifest that is utilized by the executing application for lazy loading.

The action manifest can map an action to a unique invoker identifier. An invoker can be a function that executes when the action is invoked by the user, such as when a user clicks a menu item in the application. The mapped action need not navigate to another page, and instead can just cause something to happen in a backend of the application or on the current page of the application. Action invokers can be split into different code modules by the compiler, with these modules being registered with the application during runtime.

During runtime of the application, the action manifest can be loaded as part of a main bundle of code that is part of initializing the application or a page of the application. The other code modules can lazy load later, as needed, asynchronously from the main code bundle. Actions that require lazy loading of a code module can be included in the action manifest. When a user invokes an action by interacting with the application (such as by selecting a menu item or clicking a button), the application can check whether an action manifest exists for that action. If so, the manifest can be used to load a code module needed for performing the action. The action manifest or an action identifier can be sent to a load factory process, which can be responsible for loading some or all of the code modules for the action manifest. These code modules can load asynchronously, and upon completion of loading, the newly registered action invoker can be executed. In one example, a route guard can also specify which menu items are available to a user. Using filters, the route guard can block particular routes, allowing the application to lazy load code modules associated with the blocked routes at a later time.

Figure 1:
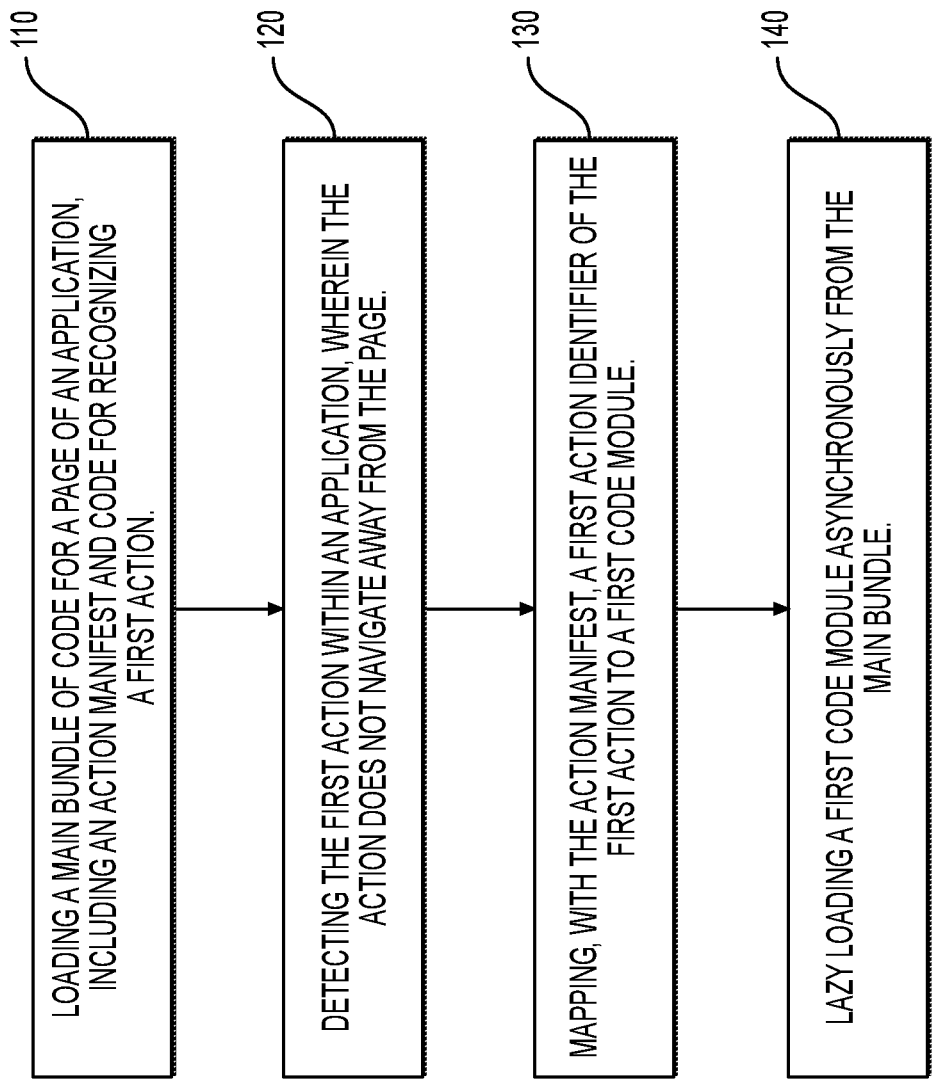
FIG. 1 is a flowchart of an example method for lazy loading of code containers for single-page applications or hybrid applications.

FIG. 1 is a flowchart of an example method for action-based lazy loading, such as for single-page applications. At stage 110, the application can load a main bundle of code for a page of an application. This can happen, for example, when the application is launched by the user on a user device or on a remote server. The main bundle can include the essential code for launching the application or displaying information that is immediately visible on the screen. In this way, the main bundle of code can be executed to ensure that the application page displays, while other code modules are left to load asynchronously at a later time and not slow down the initial loading of the application.

The main bundle can be preconstructed by a compiler that makes intelligent decisions on what code to include in the main bundle versus other code modules for lazy loading. To do this, the compiler can rely on a route configuration that specifies which features are available based on other features being selected. The route configuration can be in a hierarchical data structure, such as a tree format, in an example. In one example, the hierarchical structure can be represented in a table. The route configuration can also be part of a hand-coded action manifest that specifies actions for lazy loading, in an example. Action manifests can map action IDs to code modules. The actions manifests can detach the code module loading from navigation by URL. Route configuration is Angular concept which maps URL to module. The action manifests can be registered as "fake" or "dummy" route configurations. Although the action manifest are not navigable URLs, a compiler can split the application code in separate modules based on the dummy route configuration. During build time the compiler can use the route configuration in order to decide how to split the code in different files. The compiler logic can remain unchanged, such that the method can work with standard compilers. Therefore, a developer-created action manifest can be compiled such that the application can lazy load based on actions.

The action manifest can map user actions on the page to code modules that are lazy loaded and not part of the main bundle. In one example, the action manifest is loaded as part of the main bundle. This allows the application to recognize actions that are tied to invokers and action handlers provided separately in a code module that needs to be lazy loaded.

At stage 120, the application can detect the first action. For detection to be possible, the main bundle can include at least enough code to identify the action. The code can also associate the action with an action identifier that is used to determine how to handle the action from there.

The detected first action can be non-navigational in nature. This means that the first action can impact the current application screen or page rather than navigating to a new page or jumping to a lower non-visible portion of the current page. The first action can instead be used to change content displayed on the page or effectuate change in the backend of the application.

In one example, the non-navigational first action can be a menu selection that provides additional menu options or changes what is populated in an area of the application page. The menu can be organized in a tree structure governed by a routing table, in an example. As routes are selected or options come available, such actions can implicate code modules that require lazy loading. Similarly, buttons or other selectable options on the application page can be used to perform actions that rely on lazy loaded code modules. For example, the user may click a "power on" option in a virtual machine context menu or select "new virtual machine" when clicking on a representation of a host.

These non-navigational actions traditionally have required the loading of all associated code with the main bundle, slowing down overall load times for the application. But by lazy loading the code associated with such actions, the application can load more quickly and then the additional code can load on demand or during times when processing power is available.

At stage 130, the application can map a first action identifier of the first action to a first code module. The first action identifier can be associated with the action in the main code bundle and can be any string of letters or numbers. The first action identifier can be associated with an invoker and the identifier itself can be a unique identifier used by the invoker to denote an associated invoker function, in an example.

The invoker associated with the action identifier can check whether an action manifest corresponds to the action identifier. Again, the action manifest can be loaded as part of the core bundle, allowing the application to recognize when a separate code module is required for performing the action. An action manifest service can check which code module is implicated by the action identifier and identify the code module to the invoker.

At stage 140, the invoker can then cause the identified code module to load if it is not already loaded. The code module can be lazy loaded asynchronously from the main module. This can include executing the code module. The code module can include, for example, JAVASCRIPT that executes to provide functionality associated with the action, among other things. Similarly, a view provided by a second framework can be invoked. The second framework can be lazy loaded as part of one of the code modules. The second framework can be needed for an optional action that the user may or may not attempt to perform, allowing it to be asynchronously loaded at a later time than the main bundle.

In one example, the code module can be lazy loaded in response to the action identifier indicating the code module is needed. In another example, the lazy loading can occur beforehand based on available processor capability while the main bundle of the application is already executing.

Figure 2:
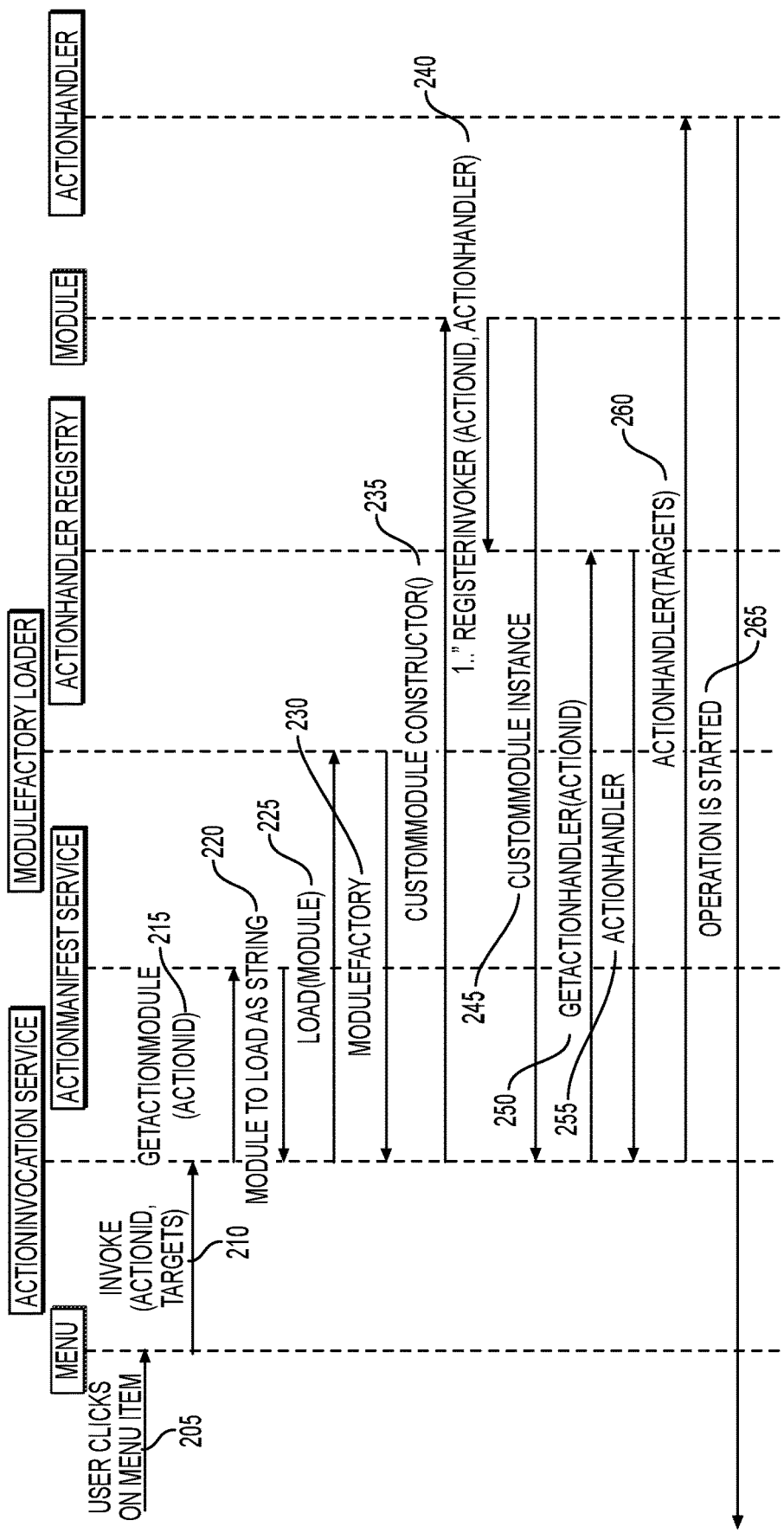
FIG. 2 is a sequence diagram of an example method for lazy loading of code containers for single-page applications or hybrid applications.

FIG. 2 is a sequence diagram of an example method for lazy loading of code containers for single-page applications. FIG. 2 illustrates the interaction of several services that can all execute as part of the application. The services can be loaded as part of the main bundle of the application, ensuring that the application then has the ability to execute functions for lazy loading additional code bundles. The services can execute on a processor-enabled device. A user device, such as a laptop, phone, or personal computer, can execute the application and the attendant services. The application can execute as a single-page web application also, with one or more of the services executing on the user device or a remote server.

At stage 205, a user can click on a menu item or other selectable item within the application. The menu item can be generated in a single-page application based on execution of a main bundle of code or some other code module that has already loaded. The menu item itself can be generated such that selecting it causes the application to recognize an action identifier (labeled "actionId"). The menu item can also be associated with an invoker used to invoke an action.

At stage 210, the application can call an application invocation service using the action identifier and one or more targets. The targets can be one or more context objects impacted by the action. For example, a "power on" button can have an action identifier, and a virtual machine being powered on can be the target. Multiple targets for a single action are possible. In one example, both the action identifier and the targets are sent to the action invocation service.

The action invocation service can determine whether it already has received an action handler for the action. For example, the code module corresponding to the action identifier may have already been lazy loaded. If so, the action invocation service can effectively skip to stage 260 and perform the action.

Otherwise, at stage 215, the action invocation service can contact the action manifest service for purposes of getting the code module that needs to be lazy loaded. In one example, the action invocation service can determine whether an action manifest corresponds to the action identifier. The compiled main bundle of code can include a mapping of action identifiers to an action manifest service for the action manifest, in one example. Alternatively, the application can blindly supply the action identifier to the action manifest service to see if a corresponding action manifest exists.

In the illustrated example, the action invocation service passes the action identifier to the action manifest service, allowing the action manifest service to determine if the corresponding code module needs to be loaded. This is represented in FIG. 2 by the getActionModule(actionId) function call.

In another example, it is possible that different target types or numbers of targets for the same action can require different code from a different code module. In one example, the code module to lazy load is selected between multiple code modules for a single action based on the target. For example, the framework for powering on a virtual machine may be different than the framework needed to power on a host. The corresponding virtual machine functionality may be in a first code module, whereas the host functionality can be in a second code module. As a result, the target in conjunction with the action can be sent to the action manifest service to select a module, in an example. The action manifest service can maintain a table or matrix to map the action identifier and potentially a target to the correct code module, in an example.

At stage 220, the action manifest service can identify the code module that needs to be lazy loaded. At stage 225, the action invocation service can then contact a module factory loader service to lazy load the code module. This is represented in FIG. 2 as the load(module) function call. The module factor loader can then run an executable file that loads the code of the code module.

At stage 230, the module factory loader can return a constructor, which can be a reference to the loaded code. The code module can have one or more constructors of registering and instantiating functions and services contained in the code module.

At stage 235, the action invocation service calls the constructor for the service or function associated with the action identifier. In one example, the constructor can be called for multiple different actions at once, such as by providing multiple action identifiers or by calling a constructor that automatically registers an invoker for many different actions.

The code module can then register an invoker for one or more actions at stage 240. This can include calling a function, such as registerInvoker(actionId, ActionHandler). The function can include an action identifier to register along with an action handler to use for that action identifier. The action handler can be the service or function that contains the code that will execute in connection with the action. The action handler can be registered with the action handler registry for retrieving by the action invocation service (i.e., by the invoker for an action).

The code module can then return an instance at stage 245. The module can then be loaded in runtime. The functions, having been registered at stage 240, can then be accessed going forward when the user makes the corresponding actions in the application.

To complete the action of stage 205, the action invocation service can get the corresponding action handler at stage 250. To do this, the action invocation service can call a function, such as getActionHandler(actionId), providing the action identifier to the action handler registry. The action handler, having already been registered, can be returned to the action invocation service at stage 255.

Then, at stage 260, the action invocation service can supply the targets to the action handler, causing the action handler to perform the corresponding operations on the targets at stage 265. For example, the action handler for "power on" can be supplied with identifiers of a virtual machine, causing functions for powering on a virtual machine to take place at stage 265.

In this way, a code module can be lazy loaded, asynchronously from the main bundle. The main bundle can contain the above services needed to locate and load additional code modules as needed. In some examples, invoking an action can cause additional actions to become available. Then those actions too can cause the lazy loading of additional code modules. This can be the case, for example, with a nested menu. The nested menu can act as a tree, with certain actions only available down certain routes of the tree.

Figure 3:
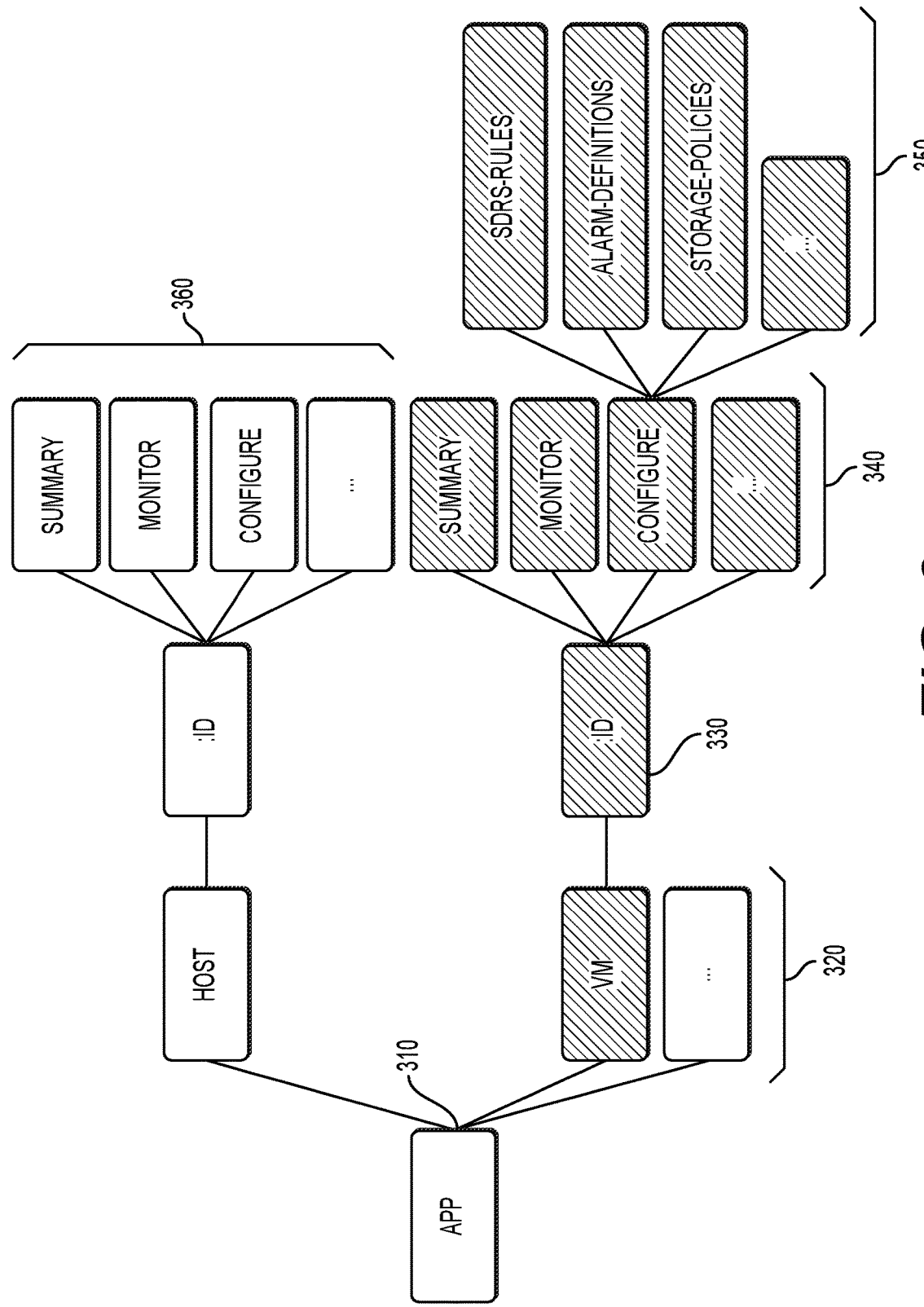
FIG. 3 is a diagram of an example route guard for lazy loading code modules associated with menu items.

FIG. 3 is a diagram of an example routing table for lazy loading code modules associated with nested actions, such as menu items. The routing table can be created to map the ways in which one action leads to another. In one example, the compiler can use the routing table to determine which functions to include in which code modules. For example, it may make sense for functionality for actions of a particular route in the route table to be provided together. This can allow those functions to be loaded and registered when the user begins traversing down the particular route in the routing table.

In the example of FIG. 3, the routing table can start at a root level represented by app 310. From there, the application can give multiple action choices represented in the level 320 of the tree hierarchy. In the illustrated example, one route begins with the "host" action and another route through the tree begins with the "vm" action. Continuing down the tree from those two options can represent two different routes in the routing table. Based on the user's interactions with VMs or hosts, the corresponding code modules for actions in those different routes may lazy load at different times.

Route guards can prevent lazy loading of certain portions of the application, which can help focus processing resources on loading code available actions in the route table. A route guard can be an interface that tells the application whether to allow an action along a requested route. Route guards can block actions in the routing table from loading, at least until some other action occurs or a lower level within the routing table is reached by the user. In one example, a route guard can return a true or false value with regard to actions in the routing table, notifying the application of which actions need to be loaded. This can cause the application to lazy load the corresponding code modules for those action identifiers.

These example actions at level 320 (host and vm) can represent different types of actions that a user can take within the single-pane application. For example, the application may display one or more of a virtual machine ("VM") and a host within a graphical user interface ("GUI"). When the user selects one of those items, the actions (vm or host) can continue to the next level in the route tree. For example, if a VM is selected, the ID action can become available at level 330 for the VM. From there, summary, monitor, and configure actions can become available at the next level 340. And then if the user selects configure, actions at still another level 350 can be revealed with respect to the target VM.

The illustrated example of FIG. 3 shows that the route path for VM is shaded differently than the route 360 for host actions. The route guards can include filters for blocking the loading of action routes 360 that are not needed yet. For example, if the user has not selected a host or no host is available yet on the screen, a filter can prevent the corresponding code for the host-related actions of route 360 from being loaded. Conversely, when the user selects an action, such as clicking the VM, that VM route can be used to lazy load code modules associated with one or more levels 320, 330, 340, 350 of actions associated with that route path.

In one example, the application can traverse the route path and load modules that are not prevented by the filters of the route guards. For example, when the user selects a VM, the filters can still block the code associated with the host path actions from loading or can specify loading all of the code modules for actions in the VM route. This can include iterating down the VM route, collecting the filters at each level, and executing the filters to load the corresponding code modules and register the functions for invocation by the actions in the VM route. This can allow the application to anticipate which code it will potentially need and prioritize the lazy loading of those code modules. Likewise, the application can delay lazy loading of code modules associated with other paths, such as the host path in this example.

As the actions traverse down the routes of the routing table, different routes can be specified for lazy loading by the route guards and filters. The filters can be set such that the application can determine the nested actions to lazy load. This can allow the corresponding functions to be available and invokable when the actions reach lower levels in the route table.

Example pseudocode for route guard using a filter is shown below:

```
Path: ObjectTabRoutes
ActivateChild: [AppGuard]
Data: {
    Filters: <RouteFilterConfiguration>
    Conditions:<NetworkConditions>
}
```

In the above example, an object tab on the GUI can have an action path dictated by a route tree called ObjectTabRoutes. The route tree can include a route guard that determines when to activate child actions in the tree. In this example, the route guard is AppGuard. The route guard can decide which child actions to activate based on a filter configuration, such as RouteFilterConfiguration.

The filter can be based on conditions that change the logic on whether certain child actions should be activated. In this example, the conditions for the filter to consider are network related and represented by NetworkConditions. The RouteFilterConfiguration filter can consider network conditions, such as whether a VM is down and a warning is on the GUI. The filter can include logic for which routes to block based on those conditions. At different levels of the route tree, the filter can apply the same or differently, depending on the logic contained in the filter.

When child actions are activated, the application can lazy load corresponding code modules for the action handlers to be used by the action invocation service. In one example, the application can traverse the route to determine which child actions to activate. At each level 320, 330, 340, 350 of the route, the application can collect the filtered action identifiers to load at each level in the route. Since the conditions of the filter can be different at each level 320, 330, 340, 350, the application can keep a list of all the actions to activate. The child routes of the current route can be cached. Then, with the cached completed list, the application can gather needed permissions and parameters for loading the code for those actions. The gathered parameters can be supplied at once as part of the credentials to load the corresponding code modules, in an example. Any needed remote calls to the server can be made with the required credentials.

The tree of available actions can then be cached to prevent delays when the user attempts to perform those actions. As an example, when a user clicks on a menu item or other type of link, the route guard can already have the route evaluation cached. This allows for returning the child actions immediately, such as child menu items or links. This increases the user experience because the user does not have to wait for extra logic or remote calls to execute. Instead, the menu can expand based on the cached route evaluation, as specified by the filters.

Using filters with route guards in this way can allow for providing a single route guard that applies to each level of the route tree. This simplifies programming of route guards, which otherwise could require a different route guard for each level of the tree. Providing a route guard at each level is inefficient. For example, if the route traverses four levels of the route tree, four different remote calls may be required if each level included its own route guard. This can lead to delays for individual actions that negatively impact the user experience.

In one example, to prevent this inefficiency, the route guard can use an optimization algorithm in conjunction with filters. The route guard can instead apply to all levels of the route tree and can calculate child routes in a single remote call. For example, a single remote call can calculate tab routes, such as app/tab1, app/tab2, and app/tab3 for a route tree with three tabs. Then, as part of that same remote call, under each tab, the child routes can be calculated (e.g., as app/tab1/toc-item1, app/tab1/toc-item2, etc.). The route guard can cache each of these child routes and its availability. This way, when a user clicks a tab or child item, the route guard can validate the route using the already populated cache without making further remote calls to the server. Each time the user clicks on another menu item, the route guard can validate the route using the already populated cache rather than making another remote call.

This can provide significant performance improvement to single-page applications by greatly reducing the number of remote calls. In addition, the application can determine the code modules needed for available routes and load those before lazy loading code modules that relate to filtered out actions. Achieving quicker load times in this way also does not sacrifice user experience for actions that are lazy loaded. Rather than waiting for the actions to traverse through the tree, action handlers can be registered for these lower-level child actions as specified by the filters. This can save load time by intelligently filtering which action invokers to register based on where in the routing table the actions currently are taking place or what actions are currently available to the user.

Figure 4:
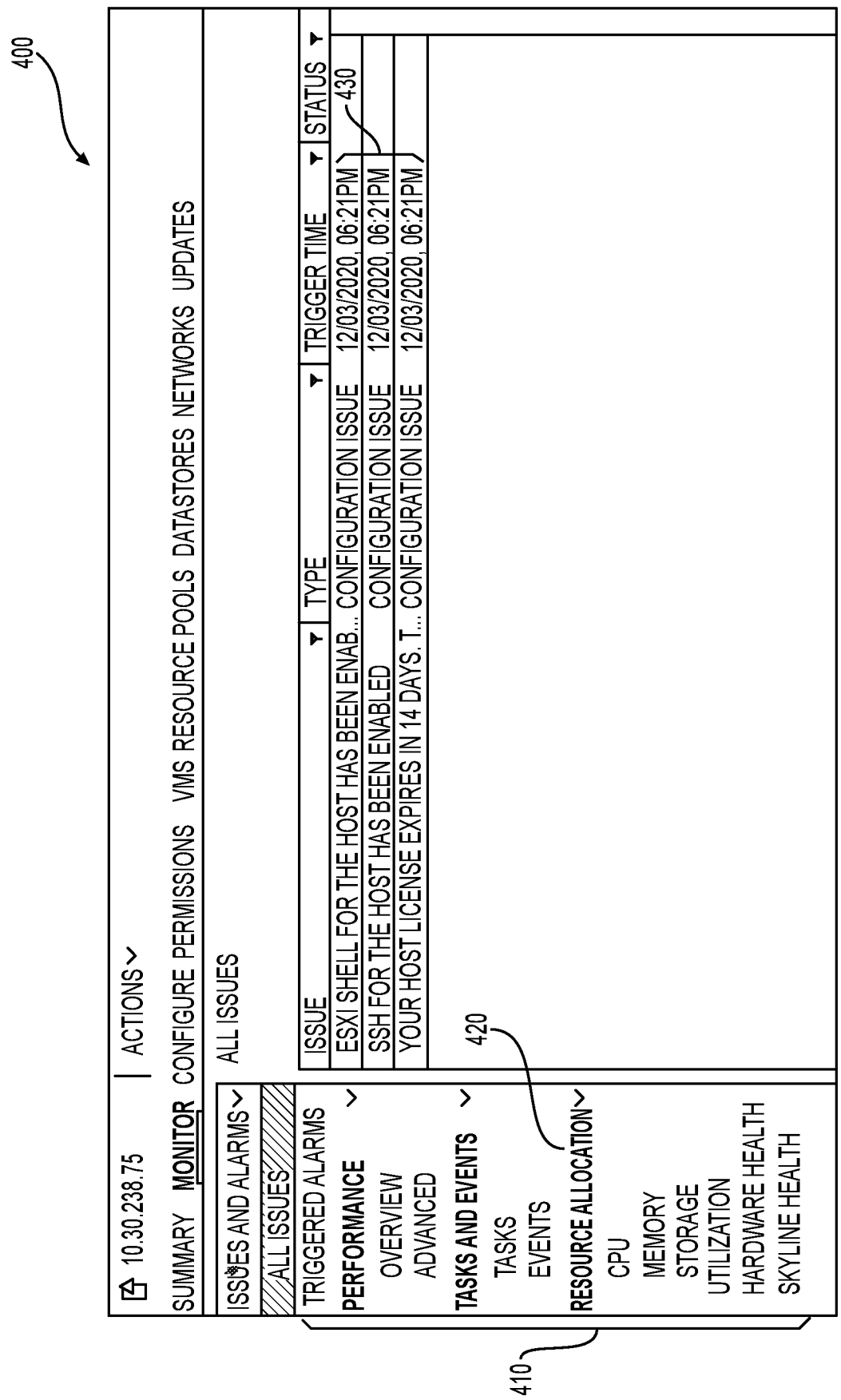
FIG. 4 is an illustration of an example GUI screen in a single-page application that uses lazy loading.

FIG. 4 is an illustration of an example GUI screen 400 in a single-page application that uses lazy loading. The single-page application can be a web application or website that interacts with the user by dynamically rewriting the current page with new data from a web server instead of navigating to entire new pages. The main bundle of code can load to display the single page and then additional code modules can lazy load at least in part based on non-navigational actions. Although a single-page application is discussed for explanatory purposes, the methods herein can also apply to multi-page applications. In those instances, each page can have its own main bundle, with additional action-based lazy loading of code modules for dynamic changes that take place on the page (and that do not rely on navigating away from the page). The application can execute on a user device or on a server, with hybrid applications having portions of the application that operate at one or the other location.

GUI screen 400 can be presented on a single page. A menu 410 can provide selectable options that correspond to actions that the application will invoke upon selection. The menu 410 is nested such that selection of one option, such as Resource Allocation 420, reveals additional options.

The additional options can be provided based on a route guard. When the user selects Resource Allocation 420 or when that option 420 is displayed, the application can use the route guard and attendant filters to traverse the Resource Allocation 420 route. At each level, the filter can determine which additional actions are available. Those can be displayed on the screen, such as the CPU, Memory, and Storage options. One or more code modules for these child options can be lazy loaded.

However, other options, such as External Storage, may be filtered out from display. As a result, the application will not check to see that the code module for External Memory is loaded. Instead, that code module can be lazy loaded at some later time once the action becomes available to the user. For example, the user may need to select some other action related to the Storage action before an External Storage option is displayed. This sort of criteria can be specified by the route guard and its filters.

Likewise, when an option such as All Issues is selected, this action may cause table 430 to populate with various alerts. The alerts may have their own actions associated with them or may cause more menu 410 items to be available. The alerts themselves may involve an additional framework for displaying details about the issue. The alerts and any attendant menu items can include action handlers in one or more code modules that need to be lazy loaded. The application can lazy load those code modules as the need arises, so that the additional actions can be handled. This can balance low load times for the page with good user experience with respect to actions that may not be immediately available on the page.

Figure 5:
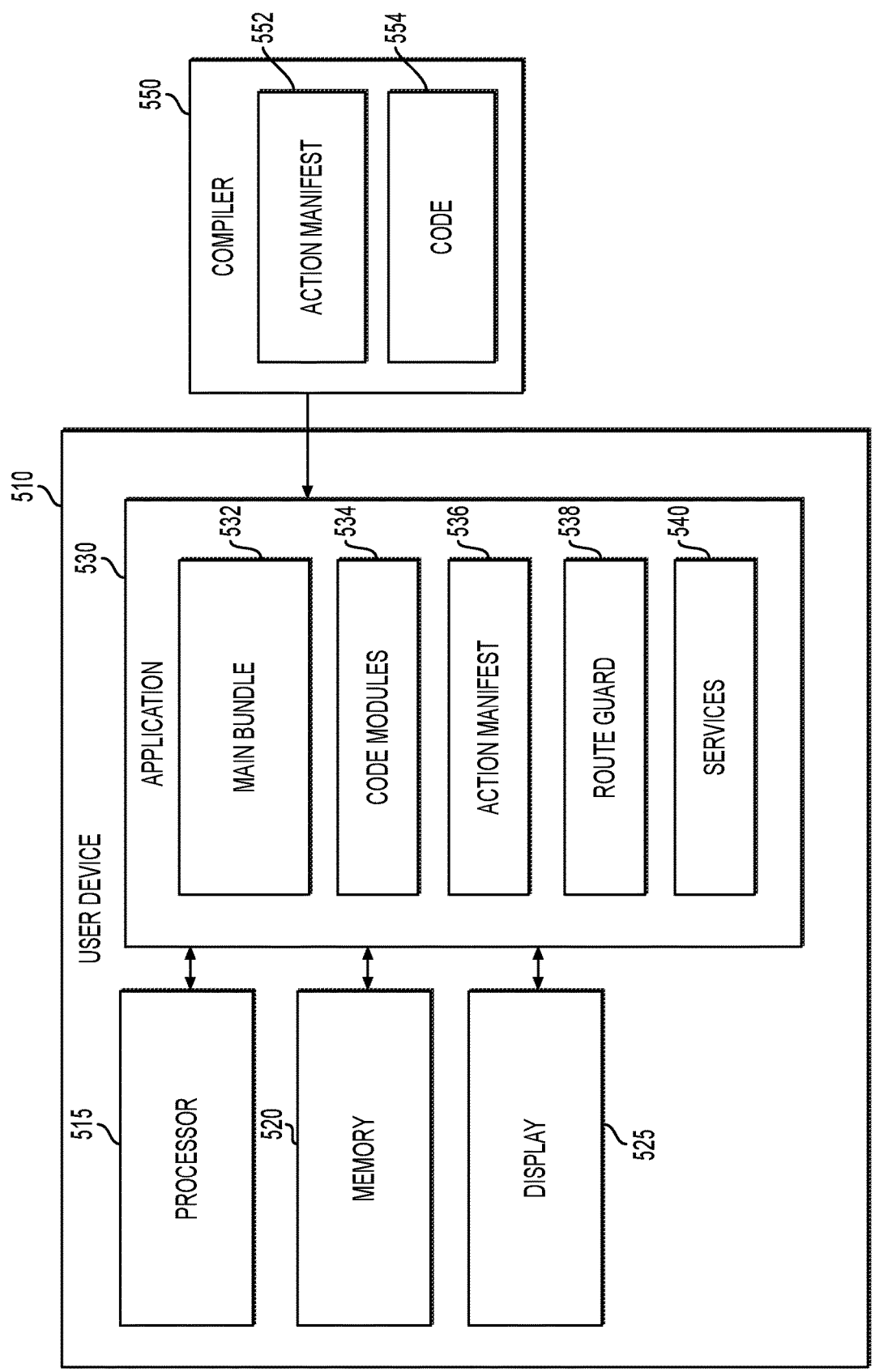
FIG. 5 is an illustration of an example system for lazy loading of code containers for single-page applications or hybrid applications.

FIG. 5 is an illustration of an example system for lazy loading of code containers for single-page applications and hybrid applications. A computing device 510 can execute an application 530 that incorporates action-based lazy loading. The computing device 510 can be the user device or a server, and the methods herein can apply to main bundles 532 of code and lazy loaded code modules 534 that are executed on a user device, server, or some on each device. The computing device can be any processor-enabled device, such as a laptop, tablet, personal computer, or hardware-based server.

The computing device 510 can execute the application using a processor 515, which can be a hardware processor. A main bundle 532 can be stored in memory 520 and executed as part of initializing the application. The main bundle 532 can initialize a page in a single-page application 530, for example. Alternatively, each page of a multipage application 530 can be initialized with its own corresponding main bundle 532. The main bundle 532 can include an executable file for initializing the application and any number of other files for providing frameworks and functionalities that need to be immediately available. The main bundle 532 can also include code for actions, which can specify an action identifier and an action invoker to call for performing the action.

Core services 540 can also be loaded as part of the main bundle 532. Some example services 540 include those of FIG. 2. For example, the action invocation service, module factory loader, and action handler registry can all be loaded as part of the main bundle 532. This can provide needed infrastructure for registering additional action handlers during run-time as other code modules 534 are lazy loaded. In general, the services 540 needed for action-based lazy loading can load as part of the main bundle 532. But additional actions that are not immediately needed can include services and functionality that is part of one or more code modules 534 that load later and asynchronously with respect to the main bundle 532.

When the main bundle 532 loads, the page of the application can display in a GUI. The GUI can be shown on a hardware display 525, which can be any type of display device. The display 525 can be built into the computing device 510, such as the screen of a phone or laptop, or can be separately connected to the computing device, such as a monitor.

The code modules 534 can include additional code that is lazy loaded at some later time than the main bundle 532. The additional code can include action handlers for performing certain actions. The additional code can also include additional frameworks and services that are not immediately needed on the page. Asynchronously loading the code modules 534 (as compared to the main bundle 532) can speed up load times for the page, which otherwise might get delayed in loading frameworks and functionalities that are not immediately needed on the page. The code modules 534 instead can be intelligently lazy loaded based on actions that occur within the application 530.

The main bundle 532 can also include an action manifest 536 that allows the application 532 to map actions over to code modules 534 that need to be lazy loaded. The action manifest 536 can include a table that links action identifiers to code modules 534, in an example. The action manifest 536 can also include one or more services 540 that execute as part of the application 530 for purposes of loading code modules 534 and registering action handlers when certain actions are invoked. The mapping of an action to the code module 534 can be based on the action identifier as well as one or more targets for the action. It is possible for an action to rely on different functions and frameworks depending on the target of the action, in an example. While these different functions and frameworks may be provided together in the same code module 534, multiple different code modules 534 may also be used depending on the size and complexities of the functions and frameworks.

In one example, additional action manifests 536 can be provided in one or more code modules 534. For example, an action can trigger lazy loading of a first code module 534 that defines additional actions. Those actions can have an additional action manifest 536 that is loaded with the first code module 534. The additional action manifest 536 can specify a second code module 534 that includes action handlers for some of the actions identified in the first code module 534. This can allow, for example, the dynamic loading of new buttons that the user might not need initially. Some of these buttons can have action handlers that are lazy loaded even further into the future as part of the second code module 534.

One or more route guards 538 can also be provided as part of the main bundle 532 or a code module 534. A route guard 538 can be interfaces that tell the application 530 whether it should allow an action on a requested route. The route guard 538 can make this decision by looking for a true or false return value based on filters and conditions of those filters. The application 530 can use multiple route guards 538 for different parts of the application 530, in an example. A menu can be displayed based on a route guard that uses filters. The application can make a single remote call to validate all the routes and then store the validated routes in a cache, such as in memory 520. Memory 520 can be a physical memory, such as random-access memory, a hard drive, or a solid-state drive. Memory 520 can be computer-readable and non-transitory.

A compiler 550 can build the application 530 such that portions are in the main bundle 532 and portions are in one or more code modules 534 for lazy loading. To do this, the compiler can read the code 554 created by programmers and decide which portions to compile into which bundles 532 or modules 534. The compiler 550 can use a preset action manifest 552 or route tree to determine which actions are needed immediately versus later. This can allow for the compilation of an action manifest 536 that is used by the application for lazy loading based on user actions and other actions that occur within the application 530.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for action-based lazy loading, comprising:
   loading a main bundle of code for a page of an application, the main bundle including:
      an action manifest that maps action identifiers to separate code modules; and
      code for recognizing a first action;
   displaying a menu on the page, wherein the menu includes multiple levels of options that do not navigate away from the page;

detecting the first action within the application, wherein the action does not navigate away from the page;

mapping, with the action manifest, a first action identifier of the first action to a first code module;

lazy loading the first code module asynchronously from the main bundle; and lazy loading a second code module asynchronously from the main bundle based on a second action identifier associated with a menu option that is at least one level down from a first level of the menu.

2. The method of claim 1, wherein a compiler splits the application into the main bundle and separate code modules based on a routing configuration provided by registering the action manifest for use with the compiler.

3. The method of claim 1, wherein the application uses the action identifier to identify the action manifest, and wherein an action manifest service returns the first code module, and wherein the first code module includes an action handler for the first action.

4. The method of claim 1, wherein displaying the menu comprises further comprising:

displaying, on the page, the options allowed by a route guard, wherein the route guard includes filters for determining which of the menu options are available to a user.

5. The method of claim 4, wherein the filters at multiple levels of a route are used in a single remote call to a server to validate which actions on the multiple levels are available to the user, wherein the available actions are cached for future validation checks based on user interactions with the menu.

6. The method of claim 4, wherein selecting one of the menu options causes the lazy loading of the second code module.

7. A non-transitory, computer-readable medium containing instructions that, when executed by a hardware-based processor, perform stages for action-based lazy loading, the stages comprising:

loading a main bundle of code for a page of an application, the main bundle including:
  an action manifest that maps action identifiers to separate code modules; and
  code for recognizing a first action;

displaying a menu on the page, wherein the menu includes multiple levels of options that do not navigate away from the page;

detecting the first action within the application, wherein the action does not navigate away from the page;

mapping, with the action manifest, a first action identifier of the first action to a first code module;

lazy loading the first code module asynchronously from the main bundle; and lazy loading a second code module asynchronously from the main bundle based on a second action identifier associated with a menu option that is at least one level down from a first level of the men.

8. The non-transitory, computer-readable medium of claim 7, wherein a compiler splits the application into the main bundle and separate code modules based on a routing configuration provided by registering the action manifest for use with the compiler.

9. The non-transitory, computer-readable medium of claim 7, wherein the application uses the action identifier to identify the action manifest, and wherein an action manifest service returns the first code module, and wherein the first code module includes an action handler for the first action.

10. The non-transitory, computer-readable medium of claim 7, wherein displaying the menu comprises:

displaying, on the page, the menu options allowed by a route guard, wherein the route guard includes filters for determining which of the menu options are available to a user.

11. The non-transitory, computer-readable medium of claim 10, wherein the filters at multiple levels of a route are used in a single remote call to a server to validate which actions on the multiple levels are available to the user, wherein the available actions are cached for future validation checks based on user interactions with the menu.

12. The non-transitory, computer-readable medium of claim 7, wherein selecting one of the menu options causes the lazy loading of the second code module.

13. A system for action-based lazy loading, comprising:

a memory storage including a non-transitory, computer-readable medium comprising instructions; and a computing device including a hardware-based processor that executes the instructions to carry out stages comprising:

loading a main bundle of code for a page of an application, the main bundle including:
  an action manifest that maps action identifiers to separate code modules; and
  code for recognizing a first action;

displaying a menu on the page, wherein the menu includes multiple levels of options that do not navigate away from the page;

detecting the first action within the application, wherein the action does not navigate away from the page;

mapping, with the action manifest, a first action identifier of the first action to a first code module;

lazy loading the first code module asynchronously from the main bundle; and lazy loading a second code module asynchronously from the main bundle based on a second action identifier associated with a menu option that is at least one level down from a first level of the men.

14. The system of claim 13, wherein a compiler splits the application into the main bundle and separate code modules based on a routing configuration provided by registering the action manifest for use with the compiler.

15. The system of claim 13, wherein the application uses the action identifier to identify the action manifest, and wherein an action manifest service returns the first code module, and wherein the first code module includes an action handler for the first action.

16. The system of claim 13, wherein displaying the menu comprises:

displaying, on the page, the menu options allowed by a route guard, wherein the route guard includes filters for determining which of the menu options are available to a user.

17. The system of claim 16, wherein the filters at multiple levels of a route are used in a single remote call to a server to validate which actions on the multiple levels are available to the user, wherein the available actions are cached for future validation checks based on user interactions with the menu.

* * * * *